(12) United States Patent
Melaragno (10) Patent No.: US 10,201,232 B2
(45) Date of Patent: Feb. 12, 2019

(54) SHELF ATTACHMENT FOR LOUNGE CHAIR

(71) Applicant: Melanie M. Melaragno, Wickliffe, OH (US)

(72) Inventor: Melanie M. Melaragno, Wickliffe, OH (US)

(73) Assignee: SHORE SHELF LLC, Wickliffe, OH (US)

( * ) Notice: Subject to any disclaimer, the term of this patent is extended or adjusted under 35 U.S.C. 154(b) by 0 days.

(21) Appl. No.: 15/596,744

(22) Filed: May 16, 2017

(65) Prior Publication Data

US 2017/0332794 A1  Nov. 23, 2017

Related U.S. Application Data

(60) Provisional application No. 62/337,565, filed on May 17, 2016.

(51) Int. Cl.
| | |
|---|---|
| *A47C 7/70* | (2006.01) |
| *F16B 2/10* | (2006.01) |
| *A47B 5/04* | (2006.01) |
| *A47B 13/16* | (2006.01) |
| *F16B 2/00* | (2006.01) |
| *A47B 5/02* | (2006.01) |
| *A47B 23/02* | (2006.01) |
| *A47C 1/14* | (2006.01) |

(52) U.S. Cl.
CPC ............... *A47C 7/70* (2013.01); *A47B 5/02* (2013.01); *A47B 5/04* (2013.01); *A47B 13/16* (2013.01); *A47B 23/02* (2013.01); *F16B 2/005* (2013.01); *F16B 2/10* (2013.01); *A47C 1/143* (2013.01)

(58) Field of Classification Search
CPC .. A47C 7/70; A47C 1/143; A47B 5/02; A47B 5/04; A47B 13/16; F16B 2/005; F16B 2/10
See application file for complete search history.

(56) References Cited

U.S. PATENT DOCUMENTS

| | | | | |
|---|---|---|---|---|
| 1,891,834 A | * | 12/1932 | Pendleton | A47B 5/02 108/135 |
| 4,122,780 A | * | 10/1978 | Brickman | A47B 3/02 108/25 |
| 4,779,884 A | * | 10/1988 | Minati | A47C 7/70 280/304.1 |
| 4,936,470 A | * | 6/1990 | Prindle | A47B 63/00 211/104 |
| 5,333,929 A | * | 8/1994 | Slagerman | A47C 7/70 297/155 |
| 5,460,276 A | * | 10/1995 | McKeon | A47B 13/16 211/41.2 |

(Continued)

*Primary Examiner* — Hanh V Tran
(74) *Attorney, Agent, or Firm* — Jacob M Ward; Ward Law Office LLC (57) ABSTRACT

A shelf attachment for use with a beach or lounge chair is formed of one-piece or has a first shelf half and a second shelf half hingedly and foldably connected to the first shelf half. An elongated member extends through interlocking projections extending from the first shelf half and from the second shelf half to hingedly connect the first and second shelf halves. A first clamp assembly is secured to the first shelf half and a second clamp assembly is secured to the second shelf half to mount the shelf to the rail of a chair.

15 Claims, 11 Drawing Sheets

(56) References Cited

U.S. PATENT DOCUMENTS

| | | | | |
|---|---|---|---|---|
| 5,887,940 | A * | 3/1999 | Anderson | A47C 7/70 108/157.11 |
| 5,893,331 | A * | 4/1999 | Diletto | A47C 7/70 108/48 |
| 9,179,769 | B1 * | 11/2015 | Port | A47C 1/12 |
| 9,554,643 | B2 * | 1/2017 | Nelson | A47B 5/02 |
| 9,629,457 | B2 * | 4/2017 | Cohen | A47B 47/0075 |
| 9,814,305 | B2 * | 11/2017 | Brus | A47B 5/02 |
| 2002/0109058 | A1 * | 8/2002 | Gish | A47C 7/70 248/229.25 |
| 2004/0139892 | A1 * | 7/2004 | Giegerich | A47B 3/002 108/26 |
| 2004/0226486 | A1 * | 11/2004 | Simpson | A47B 5/00 108/47 |
| 2007/0056482 | A1 * | 3/2007 | Robinson | A47B 3/06 108/25 |
| 2007/0101908 | A1 * | 5/2007 | Makita | A47B 5/02 108/47 |
| 2008/0041282 | A1 * | 2/2008 | Goschy | A61G 5/10 108/141 |
| 2014/0102337 | A1 * | 4/2014 | Ralph | A47B 37/04 108/25 |
| 2015/0208634 | A1 * | 7/2015 | Box | A01K 97/10 108/25 |
| 2015/0320196 | A1 * | 11/2015 | Polizzi | A47B 5/02 320/101 |
| 2016/0037906 | A1 * | 2/2016 | Knight | A47B 5/04 108/42 |
| 2016/0113388 | A1 * | 4/2016 | Distefano | A47B 5/04 108/41 |
| 2016/0223002 | A1 * | 8/2016 | Muller | A47B 5/02 |
| 2017/0042321 | A1 * | 2/2017 | Clause | A47B 13/021 |

* cited by examiner

SHELF ATTACHMENT FOR LOUNGE CHAIR

CLAIM OF PRIORITY

This application claims priority to provisional patent application Ser. No. 62/337,565 filed on May 17, 2016, the entirety of which is incorporated by reference herein.

BACKGROUND OF THE DISCLOSURE

This disclosure relates generally to chairs and more specifically to lightweight chairs commonly referred to as beach chairs or lawn chairs or beach/lounge chairs. The present disclosure provides an improved shelf, or legless table attachment for a lawn, pool or beach lounge chair. The table attachment of the present disclosure is capable of being easily adhered, rotated and removed from the arms of the chair or the frame of the chair by clamps which can mount onto the top, side, or bottom of the chair arms, rails or frame. The shelf attachment can also be folded for easy storage and transportation. The shelf can also be used for various applications, such as at the beach, a pool, a sporting event, at a campsite, etc. The shelf can be attached to a chair, or any frame, such as a table, a grill, etc.

The concept of lawn, or pool and beach lounge chairs is well known and further shelf-like attachments for these types of chairs, although limited, are known. However, many existing shelf attachments for folding lawn and zero gravity folding chairs are not effective for stationing (i.e. not foldable), reclining beach lounge chairs for several reasons.

First, existing shelf attachments are often positioned on the side of the person sitting in a foldable chair. The few shelf attachments that exist require the use of foldable legs of the chair to secure the unit to the chair. When the legs of the chair are extended open, the shelf is securely adhered to the chair; once you fold the chair legs back inward then the shelf disengages from the chair. This can be a cumbersome operation. Given that most, if not all, of stationary, reclining beach lounge chairs do not have foldable legs, these types of shelves do not apply and/or are not functional with these chairs.

Second, other types of shelf attachments are not foldable to be folded up neatly for storage or transportation. Thus, the shelf attachments that do not easily fold may severely limit the portability of the chair or shelf attachment. That said, some of the current side-connection shelves for foldable chairs, although small and removable, do not apply or are not effective for the standard resort-style, stationary, reclining beach lounge chair. These beach lounge chairs do not have foldable legs, therefore, these shelves would never be able to be adhered to these style of chairs.

Accordingly, it would be desirable to provide a shelf attachment for a chair including reclining beach lounge chairs, pool lounge chairs, and lawn chairs, including foldable lawn chairs, whereby the shelf attachment may be easily mounted to and removed from the chair and can be easily folded in half via a hinge for easy storage and transportation. Further, it would be desirable to provide a shelf attachment with a universal type clamp arrangement which can be used with a variety of chair frames, such as round or square or rectangular cross-sectional frames.

Still other aspects of the disclosure will become apparent upon reading and understanding the forgoing detailed description.

SUMMARY OF THE DISCLOSURE

In accordance with one embodiment of the disclosure, a shelf attachment for use with a lounge chair has: a first shelf half; a second shelf half hingedly connected to the first shelf half; and an elongated member extending through projections extending from the first shelf half and from the second shelf half to hingedly connect the first and second shelf halves; and a first clamp assembly secured to the first shelf half and a second clamp assembly secured to the second shelf assembly.

In accordance with another embodiment of the disclosure, the first shelf half and second shelf half are formed of thermoplastic material.

In accordance with another embodiment of the disclosure, the first and second shelf halves can be folded together.

In accordance with another embodiment of the disclosure, the shelf can be formed of one piece and be non-foldable.

In accordance with another embodiment of the disclosure, projections formed in the first shelf half interlock with projections formed in the second shelf half.

In accordance with another embodiment of the disclosure, the first shelf half has a cup holder opening for holding a cup holder formed of nylon mesh.

In accordance with another embodiment of the disclosure, storage pouches formed of nylon mesh can be secured to a side of the first shelf half and the second shelf half.

In accordance with another embodiment of the disclosure, the first and second clamp assembly each has a base having a first portion and a second portion and a substantially u-shaped opening formed between the first and second portions and a clamp pivot member is pivotally secured to the second portion of the base.

In accordance with another embodiment of the disclosure, the first clamp and second clamp assembly have foam rubber pads secured to the first portion and the clamp pivot member.

In accordance with another embodiment of the disclosure, the first clamp assembly and second clamp assembly each has an upper clamp and a lower clamp which are hingedly connected to each other, the upper clamp can have an upper angled wall and the lower clamp can have a curved wall.

In accordance with another embodiment of the disclosure, the first clamp assembly and second clamp assembly can be mounted to the first shelf half and the second shelf half in one of a first orientation and a second orientation 90 degrees or 180 degrees offset from the first orientation.

Still other aspects of the disclosure will become apparent upon a reading and understanding of the following detailed description.

DETAILED DESCRIPTION OF THE DISCLOSURE

Like reference numerals will be used to refer to like or similar parts from Figure to Figure in the following description of the drawings.

Referring now to FIGS. 1-11, a shelf tray or attachment A is shown in accordance with a preferred embodiment of the disclosure.

Figure 1:
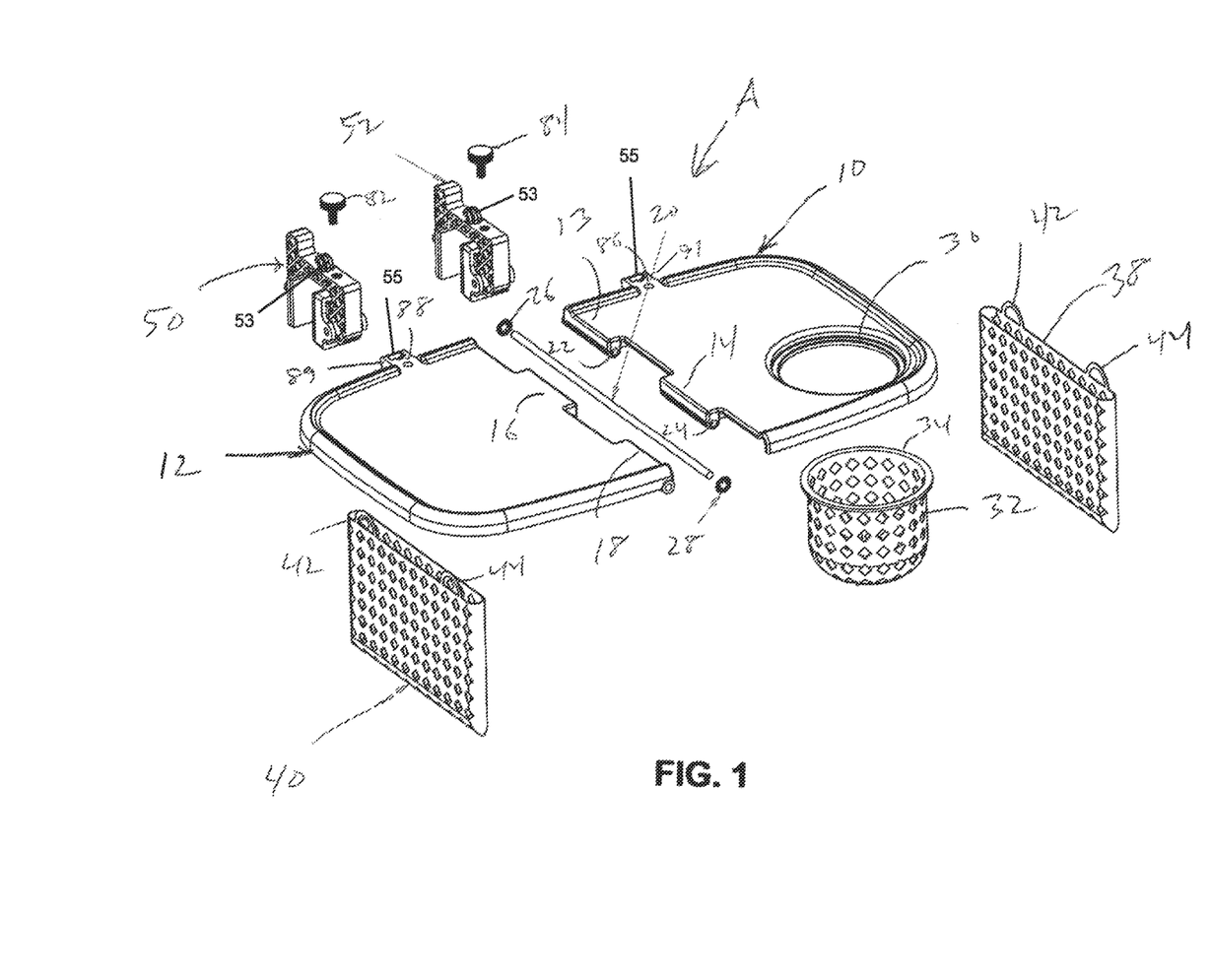
FIG. 1 is an exploded perspective view of the shelf assembly in accordance with a preferred embodiment of the disclosure.
Figure 2:
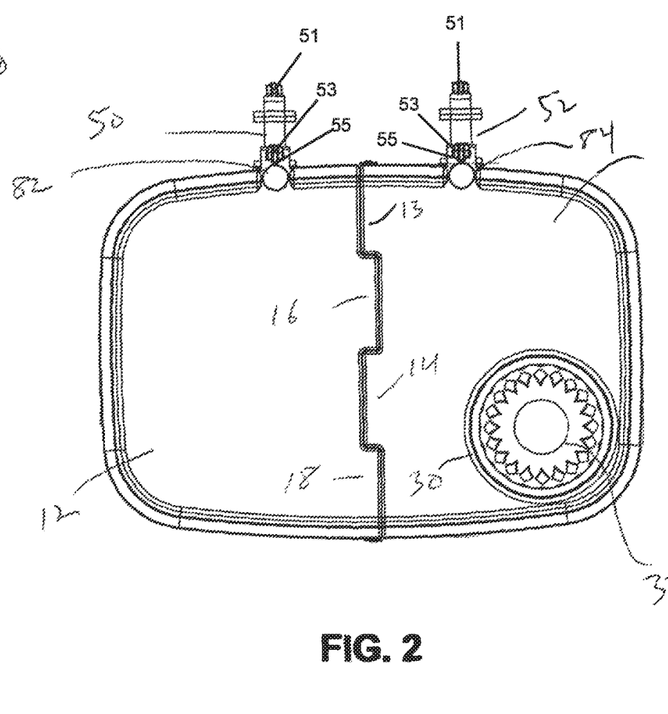
FIG. 2 is a top plan view of the shelf of FIG. 1.
Figure 3:
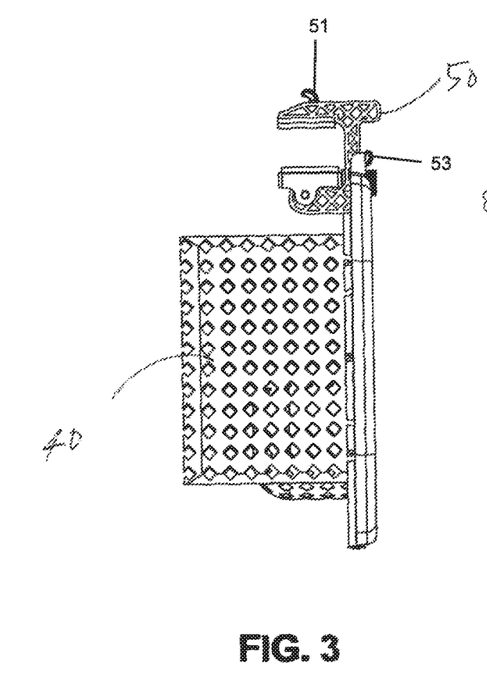
FIG. 3 is a side elevational view of the shelf of FIG. 1.

The shelf tray has a first or left shelf half 10 and a second or right shelf half 12. The shelf can be made of any suitable material, but thermoplastic polymer such as acrylonitrile butadiene styrene (ABS) is preferred. An alternative shelf could be formed of one piece and be non-foldable.

First half 10 has one or more projections 13, 14 which interlock with mating projections 16, 18 on second half 12. A hinge pin 20 extends through openings 22, 24 formed in first and second halves to connect them together and form a hinge assembly so that the two halves 10, 12 can be rotated into a storage position or an in use position in either an upwardly or downwardly direction. That is, one or both of the halves may be rotated with respect to the other. The hinge pin is preferably made of stainless steel. Retaining washers 26, 28 also made of stainless steel are secured to opposite ends for pin 20 to prevent the pin from sliding out of engagement with halves 10, 12 to facilitate locking the shelf halves together.

Shelf half 10 can also have a cup holder opening 30 for retaining a cup holder 32. Cup holder 32 is preferably made from a nylon mesh material and has an upper rim 34 for holding the cup holder in place within opening 30.

Figure 6:
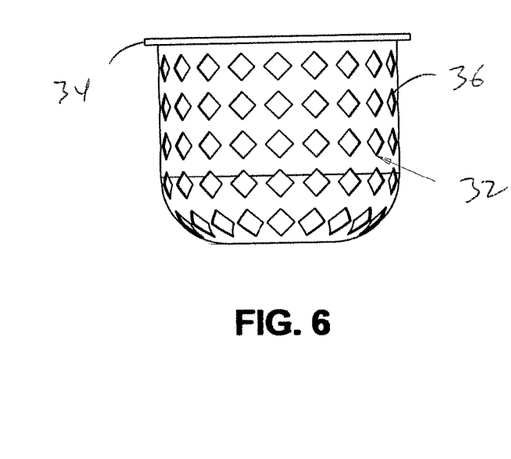
FIG. 6 is a side elevational view of a cup holder for the shelf of FIG. 1.
Figure 7:
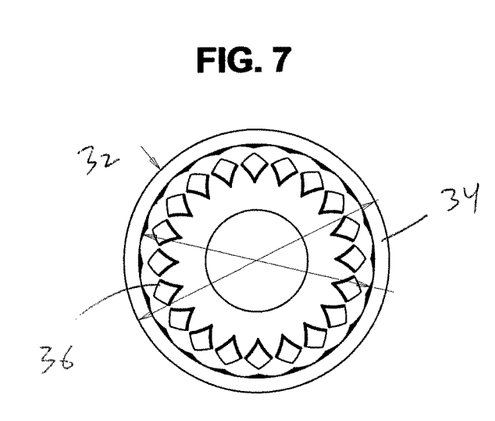
FIG. 7 is a top plan view of the cup holder of FIG. 6.
Figure 8:
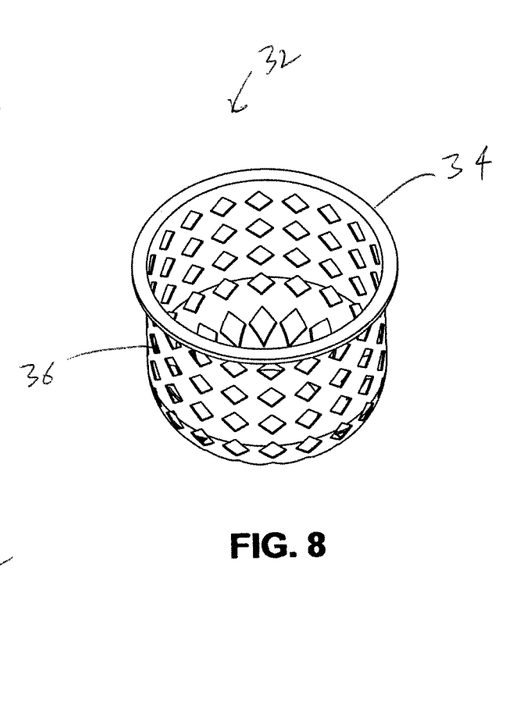
FIG. 8 is a perspective view of the cup holder of FIG. 6.

Referring now to FIGS. 6, 7 and 8, various views of the cup holder 32 and its mesh 36 are shown.

One or more storage pouches 38, 40, also formed of a nylon mesh, can be attached or secured to sides of the shelf halves via attachment loops 42, 44.

Figure 9:
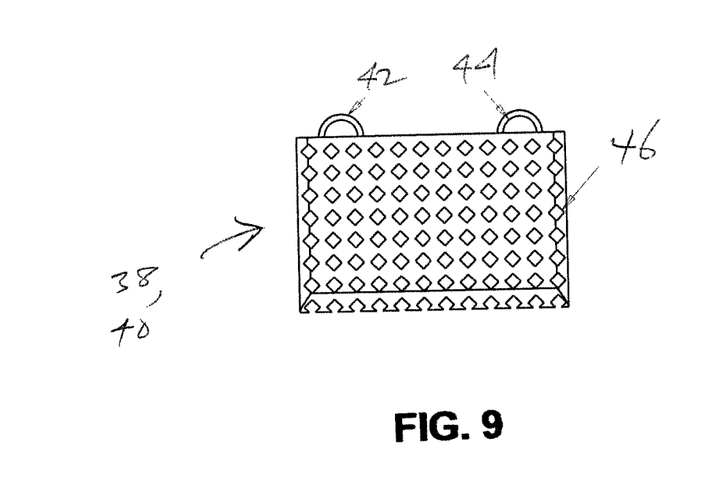
FIG. 9 is a side elevational view of a storage pouch for the shelf of FIG. 1.
Figure 10:
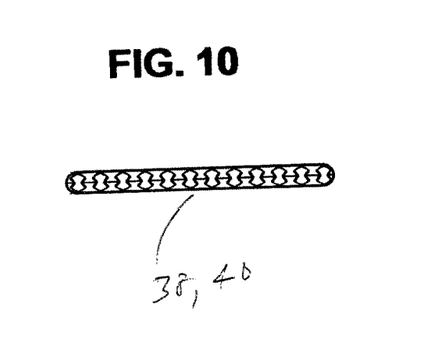
FIG. 10 is a top plan view of the pouch of FIG. 9.
Figure 11:
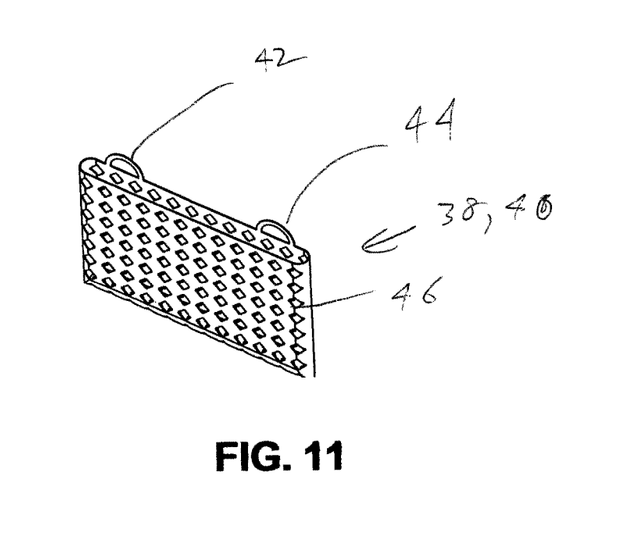
FIG. 11 is a perspective view of the storage pouch of FIG. 9.

Referring to FIGS. 9, 10 and 11, various views of the storage pouches 38, 40 including mesh 46 are shown.

Figure 4:
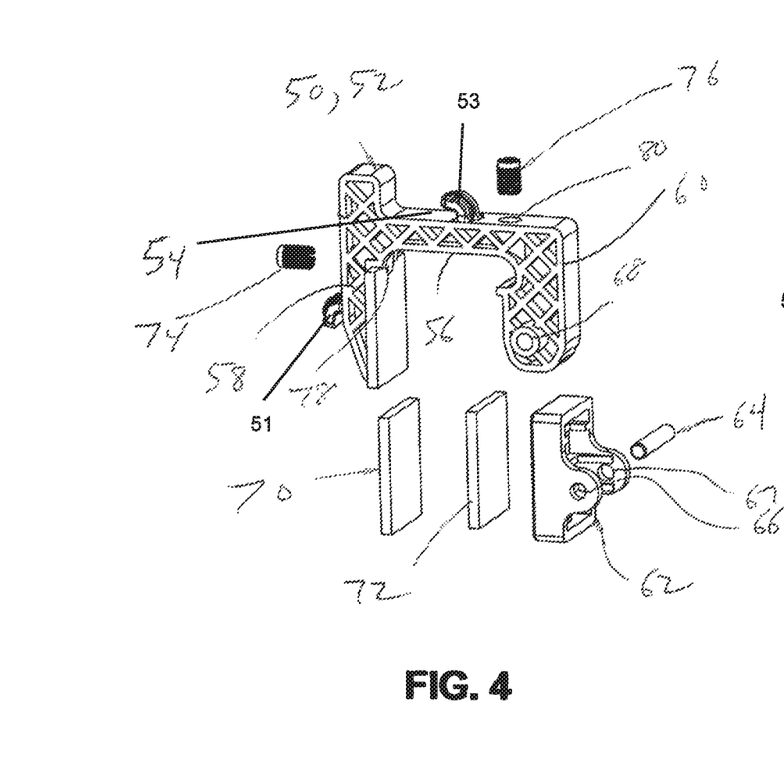
FIG. 4 is an exploded perspective view of a clamp assembly for the shelf in accordance with another aspect of the disclosure.
Figure 5:
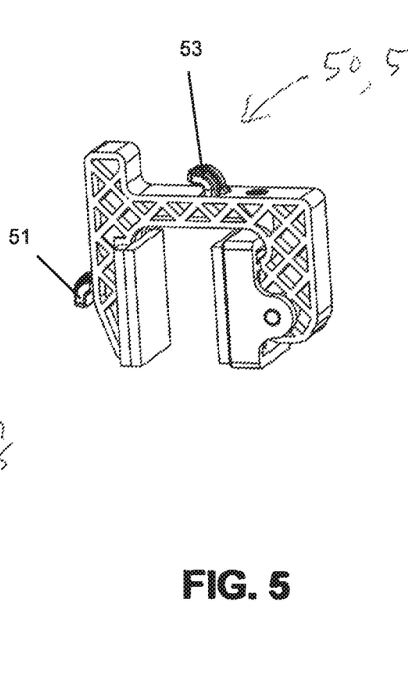
FIG. 5 is a perspective view of a assembled clamp assembly of FIG. 4.

Referring back to FIG. 1, a pair of clamp assemblies 50, 52 in accordance with a preferred embodiment of the disclosure are shown. Referring now to FIGS. 4 and 5, details of the clamp assembly are shown. Clamp base 54, which is preferably made of thermoplastic polymer, such as ABS, has a substantially u-shaped opening 56 formed between walls 56, 60.

A clamp pivot 62, also preferably made of ABS, is pivotedly secured to wall 60 via a dowel pin 64 inserted through opening 66 of wall 60 and opening 68 of pivot 62.

A pair of pads 70, 72, such as rubber or foam pads are secured to inner surfaces of walls 58, 60. Threaded inserts 74, 76 are inserted into openings 78, 80 of clamp base 54.

Thumb screws 82, 84 can be threaded into inserts 74, 76 and into openings 86, 88 in tabs 89, 91 extending from halves 10, 12 to retain the clamp assemblies to the shelf halves 10, 12. Each of the clamp assemblies 50, 52 also may have at least one protrusion 51, 53 that is configured to be removably received by an aperture 55 formed in one of the first shelf half 10 and the second shelf half 12. Advantageously, the clamp assemblies 50, 52 may have a first protrusion 51 and a second protrusion 53, disposed at different locations on the clamp assemblies 50, 52, allowing the clamp assemblies 50, 52 to connect with one of the first and second shelf halves 10, 12 in different orientations. For example, as shown in FIGS. 1-5 and 19-20, each of the clamp assemblies 50, 52 may have a first hook-shaped protrusion 51 affixed to one of the clamp walls 58, 60 and a second hook-shaped protrusion affixed to the base 54 of the clamp assembly 50, 52.

The clamps can be resiliently biased so they can flex outwardly when they are placed onto an arm rail or other rail of a chair and then biased inwardly to return toward their biased positions. The clamp assemblies can be installed on the shelves in the orientation shown in FIG. 19 ("orientation A") or rotated 90 degrees to the orientation shown in FIG. 20 ("orientation B"). The clamp assemblies lock onto a rail of a beach or lounge chair, such as an arm rail or a rear or back rail.

Referring now to FIGS. 12-18, a shelf tray or attachment B is shown in accordance with another embodiment of the disclosure. For items that are substantially the same as described for the embodiment of FIGS. 1-11, like referenced numerals are used with an asterisk.

Figure 12:
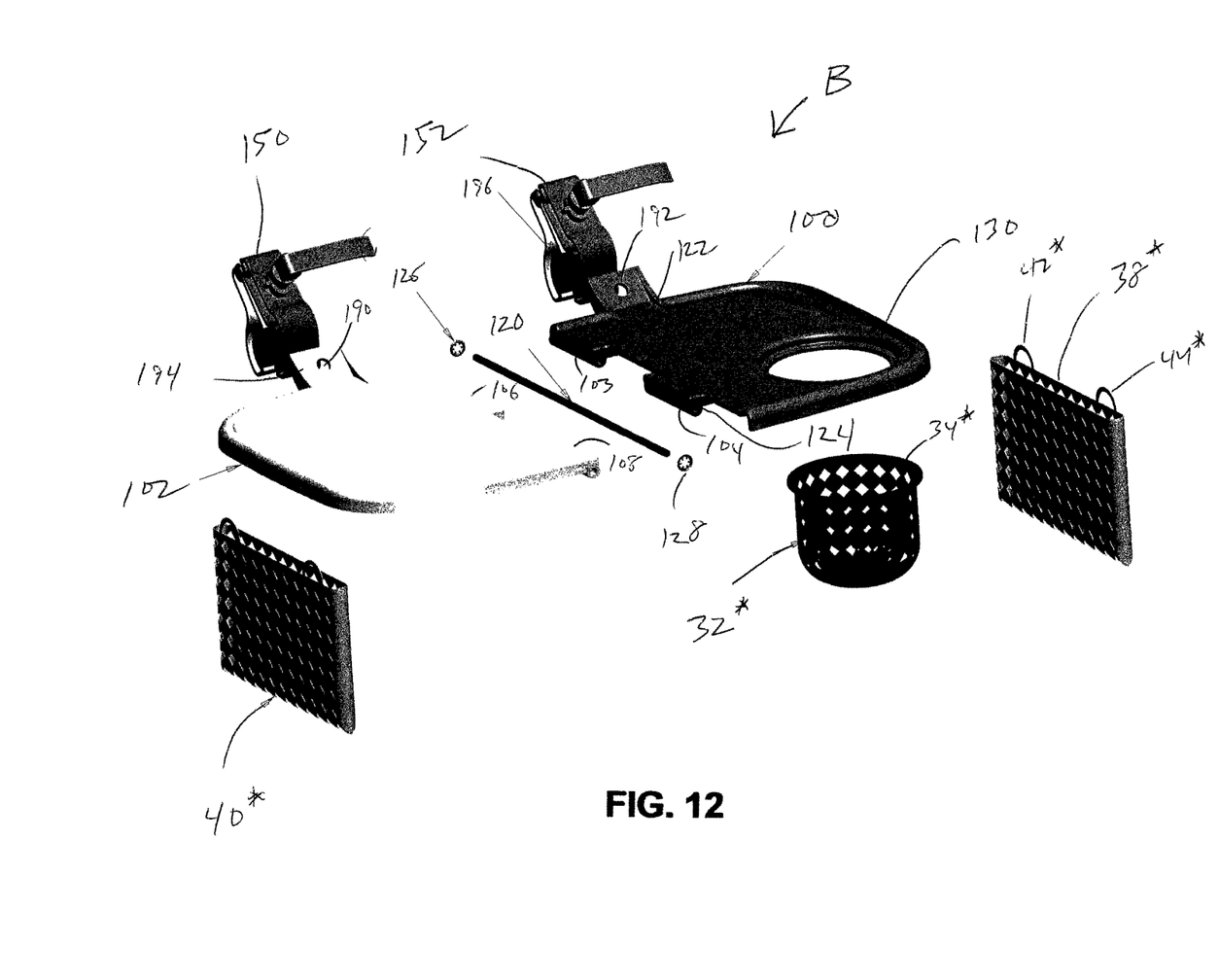
FIG. 12 is an exploded perspective view of a shelf assembly in accordance with another embodiment of the disclosure.
Figure 13:
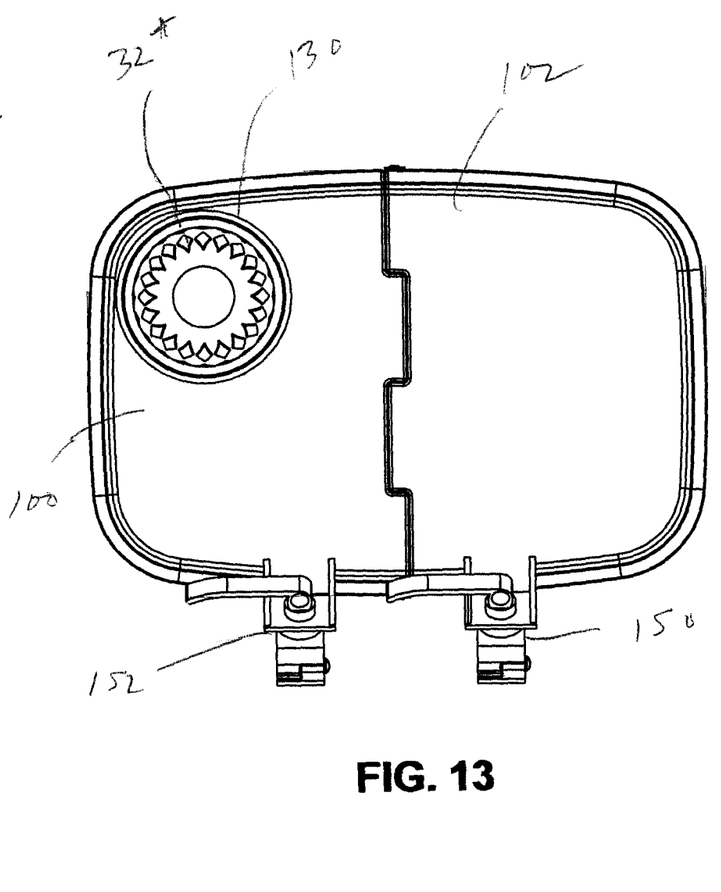
FIG. 13 is a top plan view of the shelf of FIG. 12.
Figure 14:
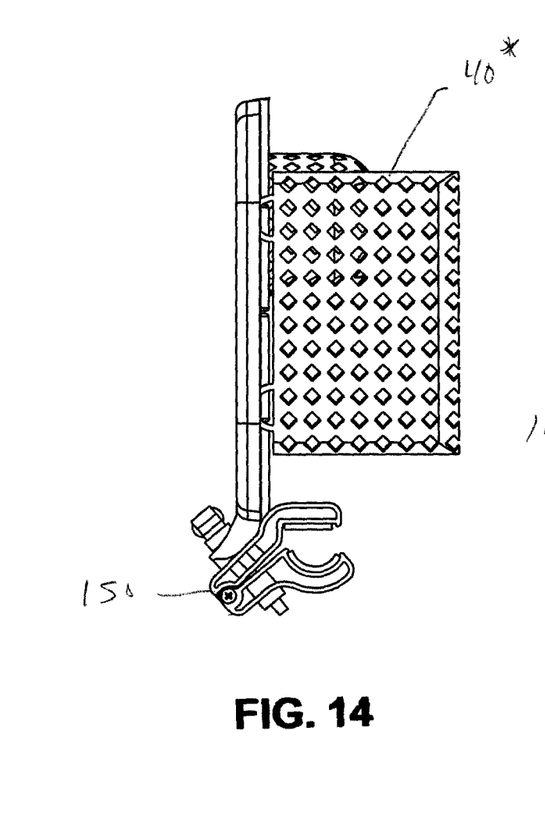
FIG. 14 is a side elevational view of the shelf of FIG. 12.

The shelf tray has a first or left shelf half 100 and a second or right shelf half 102. The shelf can be made of any suitable material, but thermoplastic polymer such as acrylonitrile butadiene styrene (ABS) is preferred.

First half 100 has one or more projections 103, 104 which interlock with mating projections 106, 108 on second half 102. A hinge pin 120 extends through openings 122, 124 formed in first and second halves to connect them together and form a hinge assembly so that the two halves 100, 102 can be rotated into a storage position in either an upwardly or downwardly direction. That is, one or both of the halves may be rotated with respect to the other. The hinge pin is preferably made of stainless steel. Retaining washers 126, 128 also made of stainless steel are secured to opposite ends of pin 120 to prevent the pin from sliding out of engagement with halves 100, 102 and to facilitate locking the two shelf halves together.

Shelf half 100 can also have a cup holder opening 130 for retaining a cup holder 32*. Cup holder 32* is preferably made from a nylon mesh material and has an upper rim 34* for holding the cup holder in place within opening 130.

One or more storage pouches 38*, 40*, also formed of a nylon mesh, can be attached to sides of the shelf halves via attachment loops 42*, 44*.

Figures 15, 16:
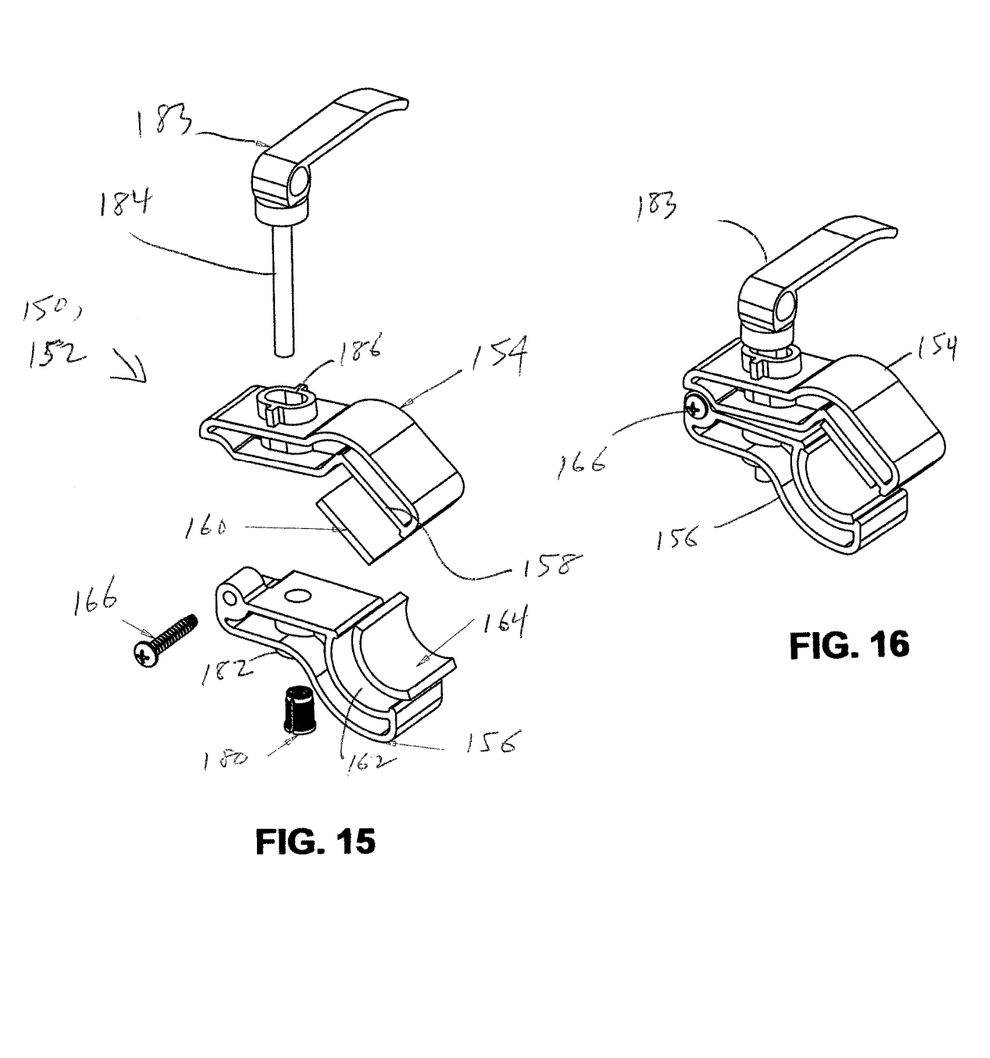
FIG. 15 is an exploded perspective view of a clamp assembly in accordance with another embodiment of the disclosure.
FIG. 16 is a perspective view of the clamp assembly of FIG. 15.
Figure 17:
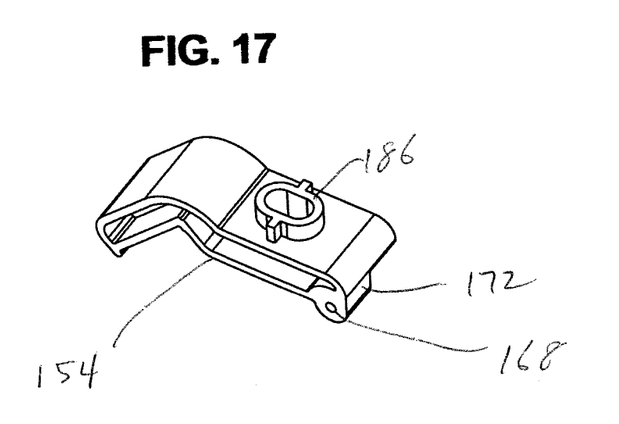
FIG. 17 is a perspective view of an upper clamp of the clamp assembly of FIG. 15.
Figure 18:
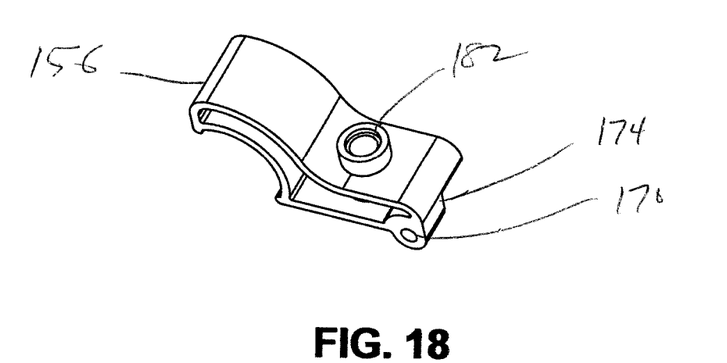
FIG. 18 is a perspective view of the lower clamp of the clamp assembly of FIG. 15.
Figure 19:
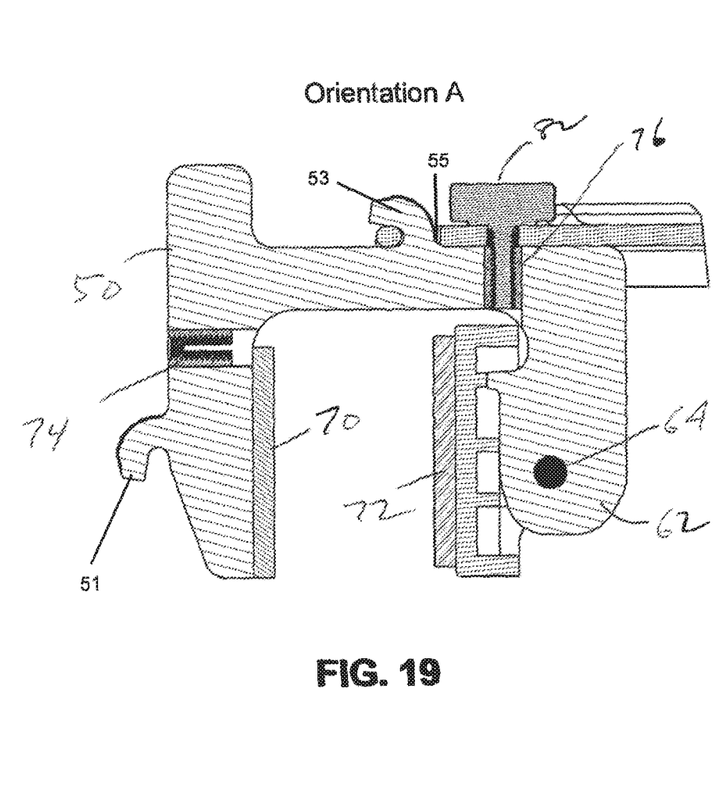
FIG. 19 is a cross-sectional view of the clamp assembly of FIG. 4 in a first orientation.
Figure 20:
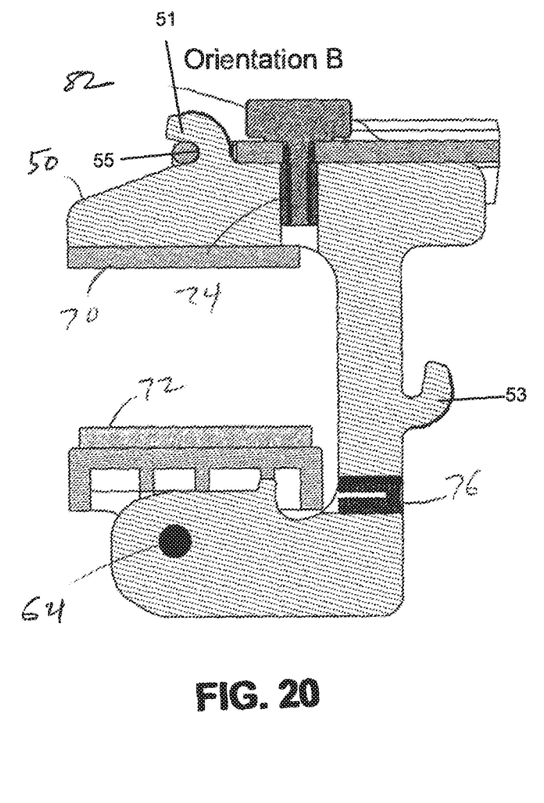
FIG. 20 is a cross-sectional view of the clamp assembly of FIG. 4 in a second orientation.

Referring now to FIGS. 15 and 16, a pair of clamp assemblies 150, 152 in accordance with another embodiment of the disclosure are shown. Each one of the clamp assemblies has an upper clamp 154 and a lower clamp 156. Clamps 154, 156 are preferably made of thermoplastic polymer, such as ABS. Upper clamp 154 has a substantially flat inner angled wall 158 to which a piece of foam rubber 160 is attached. Lower clamp 156 has a substantially c-shaped wall 162 to which a c-shaped piece of foam rubber 164 is attached. Upper and lower clamps 154, 156 are hingedly connected via a pin or screw 166 which extends through openings 168, 170 formed in projections 172, 174 of clamps 154, 156 (See FIGS. 17 and 18). That is, upper and lower clamps can be pivoted to create a larger or smaller opening in which to receive a chair rail.

A threaded insert 180 extends into and through an opening 182 formed in lower clamp 156. A handle 183 and pin 184 assembly is inserted into opening 186 in upper clamp 154 and through insert 180 to further secure the upper and lower clamps together.

Figure 21:
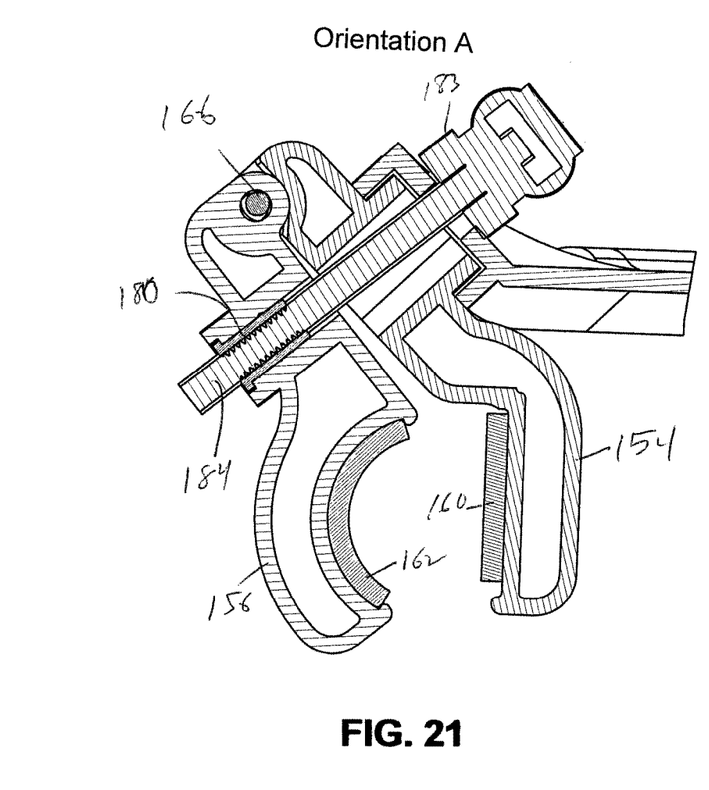
FIG. 21 is a cross-sectional view of the clamp assembly of FIG. 15 in a first orientation; and, FIG. 22 is a cross-sectional view of the clamp assembly of FIG. 15 in a second orientation.
Figure 22:
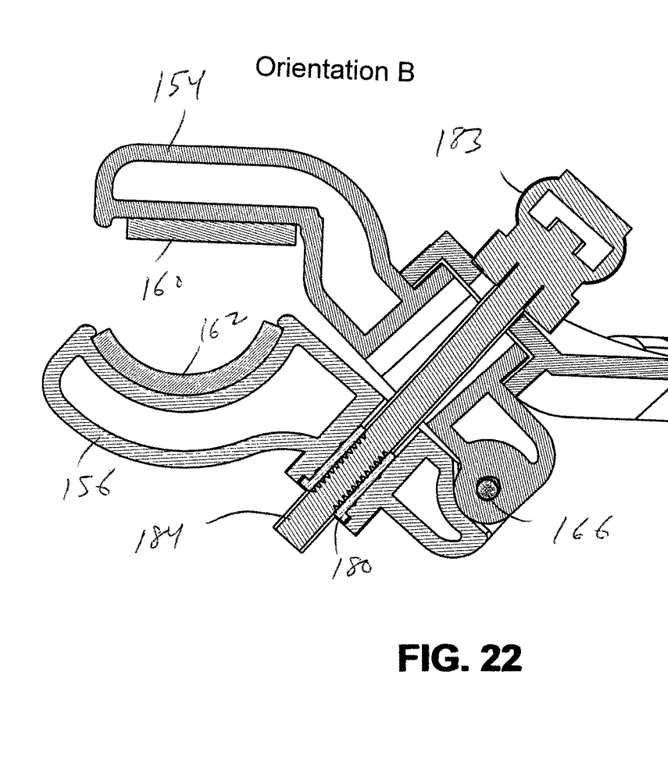

The pin 184 is also inserted into openings 190, 192 formed in projections 194, 196 which extend from first and second shelf halves 100, 102. Projections 194, 196 are angled or curved upwardly with respect to the shelf halves 100, 102 to facilitate mounting the clamps at an angle to the shelf. As the pin 184 is threaded into threaded insert 180, the pin retains the upper and lower clamps to the shelf half. Handle 183 can be turned or rotated to tighten the pin within the threaded insert. The clamp assemblies can be mounted to the shelves as shown in FIG. 21 ("orientation A") or can be rotated 180° to be installed in another configuration as in FIG. 22 ("orientation B").

The clamp assemblies can be mounted or clamped onto the top of the frame or arm of a beach or lounge chair, or can be rotated and attached on the side of the arm or frame member. The clamp assembly and shelf can also be mounted onto the top of a back rest frame of a chair.

Alternatively, the clamp assembly and shelf can be mounted on the frame at the front or leg rest portion of the chair.

The shelf can be used in various applications, including beach or pool lounge chairs, lawn chairs, tables or grills.

A clamp assembly can also be a universal clamp which can easily be mounted on a square or rectangular cross sectional frame member or a round cross sectional frame member or any other cross-sectional frame.

Although preferred embodiments of the present disclosure have been illustrated and described, it will at once be apparent to those skilled in the art that variations may be made within the spirit and scope of the present disclosure and the appended claims.

The invention claimed is:

1. A shelf attachment for use with an associated chair, comprising:
    a first shelf half;
    a second shelf half hingedly and foldably connected to said first shelf half, each of said first shelf half and said second shelf half having an aperture formed therein; and
    a clamp assembly removably secured to one of said first shelf half and said second shelf half, said clamp assembly having a main body and at least one protrusion that is removably disposed in said aperture of one of said first shelf half and said second shelf half, said at least one protrusion having a proximal end, a distal end, a convex surface, and a concave surface, said proximal end directly connected to said main body of said clamp assembly and said convex surface and said concave surface connecting at said distal end.

2. The shelf attachment of claim 1, wherein said first shelf half and said second shelf half are formed by thermoplastic material.

3. The shelf attachment of claim 1, wherein projections formed in said first shelf half interlock with projections formed in said second shelf half.

4. The shelf attachment of claim 1, wherein said first shelf half comprises a cup holder opening for holding a cup holder.

5. The shelf attachment of claim 4, wherein said cup holder comprises nylon mesh.

6. The shelf attachment of claim 1, further comprising at least one storage pouch which is secured to a side of one of said first shelf half and said second shelf half.

7. The shelf attachment of claim 6, wherein said at least one storage pouch comprises nylon mesh.

8. The shelf attachment of claim 1, wherein said clamp assembly comprises a base having a first portion and a second portion, wherein a substantially u-shaped opening is formed between said first and second portions.

9. The shelf attachment of claim 1, wherein said clamp assembly can be mounted to the one of said first and second shelf halves in one of a first orientation and a second orientation 90-degrees offset from said first orientation.

10. The shelf attachment of claim 1, wherein the at least one protrusion is hook-shaped.

11. The shelf attachment of claim 10, wherein the at least one protrusion includes a first hook-shaped protrusion and a second hook-shaped protrusion, the first hook-shaped protrusion disposed on a clamp wall of the clamp assembly and the second hook-shaped protrusion disposed on a base of the clamp assembly.

12. The shelf attachment of claim 11, wherein the clamp wall of the clamp assembly is disposed on a first plane and the base of the clamp assembly is disposed on a second plane, the first plane oriented transverse to the second plane.

13. The shelf attachment of claim 12, wherein the first plane is oriented orthogonal to the second plane.

14. The shelf attachment of claim 1, wherein the convex surface and the convex surface are disposed on opposite sides of the at least one protrusion.

15. A shelf attachment for use with an associated chair, comprising:
    a first shelf half;
    a second shelf half hingedly and foldably connected to the first shelf half, each of the first shelf half and the second shelf half having an aperture formed therein; and
    a clamp assembly removably secured to one of the first shelf half and the second shelf half, the clamp assembly having a main body with a first protrusion and a second protrusion, the main body further having a clamp wall and a base, the clamp wall disposed on a first plane and the base disposed on a second plane, the first plane oriented transverse to the second plane, and each protrusion having a proximal end, a distal end, a convex surface, and a concave surface, the proximal end directly connected to the main body, and the convex surface and the concave surface connecting at the distal end,
    wherein the first protrusion is disposed on the base and the second protrusion disposed on the clamp wall.

\* \* \* \* \*